United States Patent [19]

Leskovec et al.

[11] 3,999,267

[45] Dec. 28, 1976

[54] METHOD FOR ASSEMBLING A LIFT TRUCK MAST

[75] Inventors: Edward V. Leskovec, Eastlake; Wayne T. Wiblin, Ashtabula, both of Ohio

[73] Assignee: Towmotor Corporation, Mentor, Ohio

[22] Filed: Sept. 22, 1975

[21] Appl. No.: 615,649

[52] U.S. Cl. ............................ 29/148.4 A; 29/469; 308/3.8; 187/9 E

[51] Int. Cl.² ...................... B66B 9/20; B23P 21/00; B21K 1/02

[58] Field of Search ....... 29/148.4 A, 469, 148.4 R; 187/9 E; 308/3.8

[56] References Cited

UNITED STATES PATENTS

| | | | |
|---|---|---|---|
| 2,936,047 | 5/1960 | Quayle | 187/9 E |
| 2,973,835 | 3/1961 | Quayle | 187/9 E |
| 3,506,092 | 4/1970 | Shinoda et al. | 187/9 E |
| 3,768,595 | 10/1973 | Kelley, Jr. | 187/9 E |
| 3,851,732 | 12/1974 | Wagner et al. | 187/9 |

*Primary Examiner*—C.W. Lanham
*Assistant Examiner*—V. K. Rising
*Attorney, Agent, or Firm*—Frank L. Hart

[57] ABSTRACT

A method for assembling a lift truck mast having a slider element positioned within a channel element.

3 Claims, 11 Drawing Figures

METHOD FOR ASSEMBLING A LIFT TRUCK MAST

BACKGROUND OF THE INVENTION

This invention relates to mast and carriage assemblies for a lift truck, and more particularly, to such an assembly which provides a pair of elongated members extensible relative to a pair of fixed channel members, and a carriage movably associated with the pair of elongated members.

In the normal fork-type lift truck, the fork thereof is carried by a vertically extensible mast assembly located at the forward end of the truck. Such fork engages a load in a lower position and is thereafter raised to a desired elevation, in which position such load is transported to a desired location, lowered, and unloaded. Such a mast assembly for supporting a fork carriage preferably includes means for its vertical extension so as to maintain minimum vertical retracted height, while also providing maximum elevation of the fork carriage.

In general, such extensible mast assemblies of known construction have included a stationary assembly fixed to the trunk and movable section including a pair of slidingly extensible rail members movable relative to the stationary assembly, and a carriage movably associated with the pair of slidingly extensible rail members. An example of such structure is found in U.S. Pat. No. 3,851,732 which issued to Wagner et al. Dec. 3, 1974 from an application filed Feb. 8, 1973.

Such previous structures have maintained minimum retracted height and provided means for elevating the fork carriage thereof above the normal vertical dimension of the stationary mast portion.

This invention resides in a method for assembling a slider element and a channel element to form a portion of the mast of the lift truck. By utilizing this method, the slider element and channel element can have permanent type slider stop element.

DETAILED DESCRIPTION OF THE INVENTION

Figure 1:
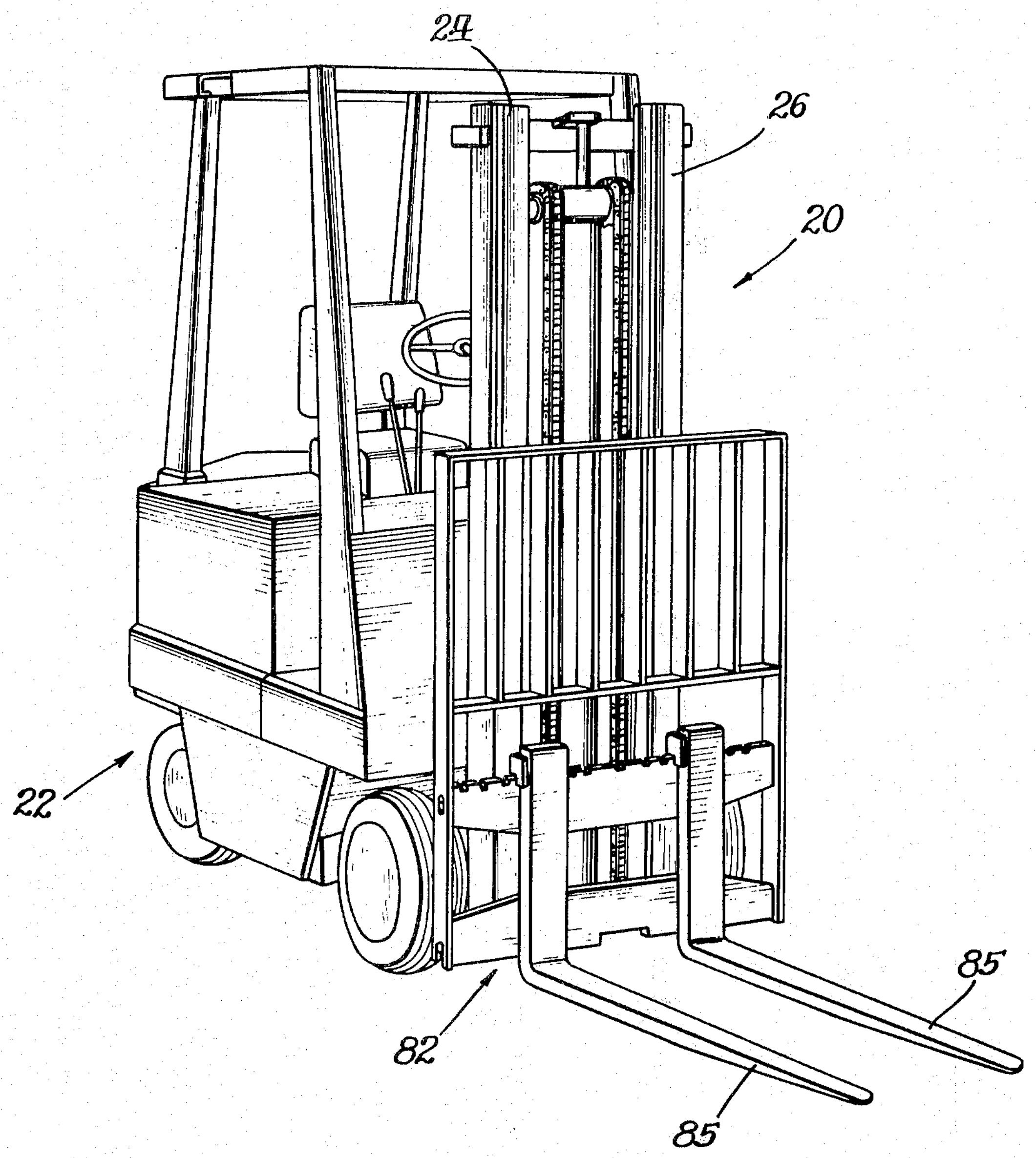
FIG. 1 is a perspective view of a lift truck incorporating the mast and carriage assembly.
Figure 2:
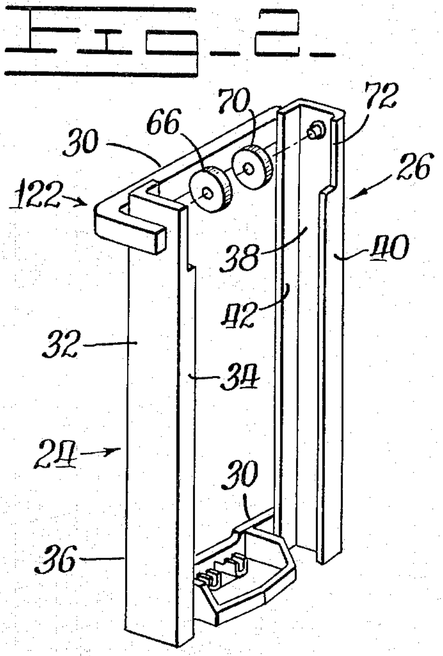
FIG. 2 is a perspective view of the channel element of the mast.
Figure 3:
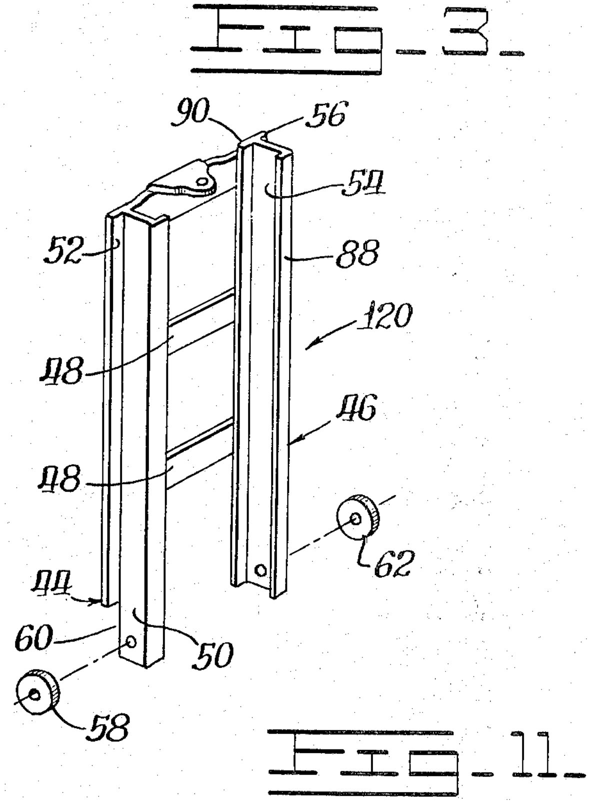
FIG. 3 is a perspective view of the slider element of the mast.
Figure 4:
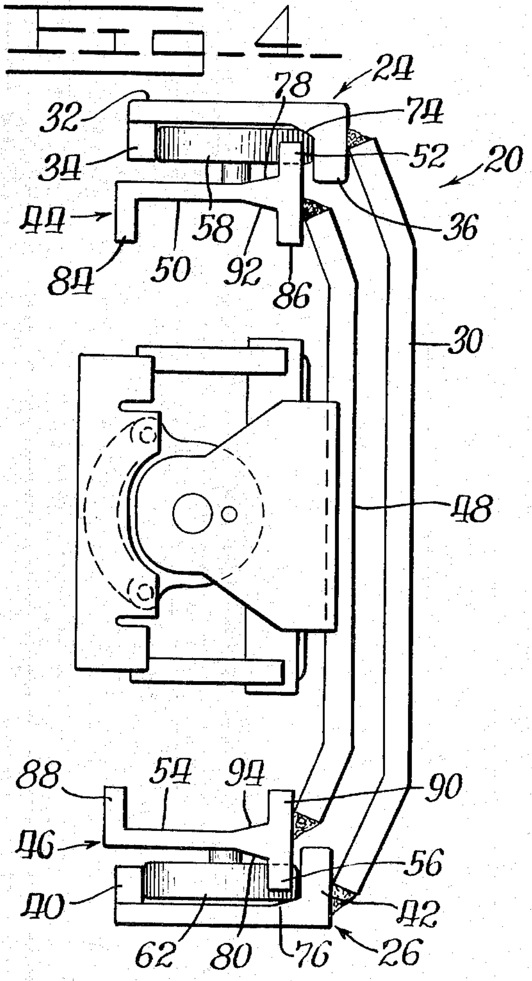
FIG. 4 is a sectional plan view of the mast and carriage assembly.

Shown generally in FIG. 1 is a mast assembly 20 in association with a lift truck 22. Such mast assembly 20 includes a pair of longitudinal, upright, laterally spaced channel members 24,26 which are fixed to the body of the truck 22. These channel members 24,26 are rigidly connected together by cross braces 30, as shown in FIG. 2. As best shown in FIGS. 2 and 4, channel member 24 defines a base portion 32 and forward and rearward parallel edge flange portions 34,36 extending from the base portion 32 and being oriented generally perpendicularly to said base portion 32. Similarly, channel member 26 defines a base portion 38 and forward and rearward parallel edge flange portions 40,42 extending from the base portion 38 and being oriented generally perpendicularly to said base portion 38. As will be seen, the flange portions 34,36 are disposed toward the channel member 26, and the flange portions 40,42 are disposed toward the channel member 24.

Longitudinal elongated slider members 44,46 are rigidly interconnected by cross braces 48 and are positioned inwardly of the channel members 24,26 respectively (FIG. 4). The elongated member 44 defines a base portion 50 and a single edge flange portion 52 which extends from the base portion 50 and is generally oriented perpendicular to the base portion 50. Said flange portion 52 extends toward the channel member 24 and is disposed between forward and rearward flange portions 34,36 and adjacent the rearward flange portion 36. Similarly, the elongated member 46 defines a base portion 54 and a single edge flange portion 56 which extends from the base portion 54 and is generally oriented perpendicular to the base portion 54. Said flange portion 56 extends toward the channel member 26 and is disposed between the forward and rearward flange portions 40,42 adjacent the rearward flange portion 42.

Bottom roller 58 is mounted to the lower end of the elongated member 44, with the single flange portion 52 defining a cutout portion 60 through which a portion of the bottom roller 58 extends. The bottom roller 58 is positioned between forward flange portion 34 and rearward flange portion 36, with the rolling portions of that bottom roller 58 adjacent said forward and rearward flange portions 34,36.

Bottom roller 62 is mounted to the lower end of the elongated member 46, with the single flange portion 56 defining a cutout portion 64 though which a portion of the bottom roller 62 extends. The bottom roller 62 is positioned between forward and rearward flange portion 40,42 with the rolling portions of that bottom roller 62 adjacent said forward and rearward flange portions 40,42.

A top roller 66 is removably mounted to the upper end of the channel member 24 (FIG. 4) with the forward flange portion 34 defining a cutout portion 68 through which a portion of the top roller 66 extends, with the rolling portion of the top roller 66 adjacent the single flange 42 of the elongated member 44. A top roller 70 is removably mounted to the upper end of the channel member 26, with the forward flange portion 40 defining a cutout portion 72 through which a portion of the top roller 70 extends, with the rolling portion of the top roller 70 adjacent the single flange portion 56.

These cutout portions 60,64 are sized such that, in combination with the bottom rollers 58,62 the top rollers 66,70 are respectively blocked thereby and cannot be moved through cutout portions 60,64. Similarly, the cutout portions 68,72 are sized such that, in combination with the top rollers 66,70, the bottom rollers 58,62 are respectively blocked and cannot be moved through cutout portions 60,64.

The manner of assembly of the structure is shown in FIGS. 7–11 and will relate to channel member 26 and elongated members 46, it being understood that the operation is the same in relation to channel member 24 and elongated member 44, and is undertaken simultaneously with the operation on the corresponding parts associated with channel member 26 and elongated slider member 46.

The channel member 24 defines an angled portion 74 which interconnects the base portion 32 and the rearward flange portion 36. The rolling portion of roller 58 is in position to contact the angled portion 74 and the forward flange portion 34, as shown. Similarly, the channel member 26 defines an angled portion 76 which interconnects the base portion 38 and the rearward flange portion 42. The rolling portions of roller 62 are in a position to contact the angled portion 76 and the forward flange portion 40.

The elongated member 44 defines an angled portion 78 which interconnects base portion 50 and single flange portion 52 so that the rolling portion of the top roller 66 is in position to contact the angled portion 78. The elongated member 46 defines an angled portion 80 which interconnects base portion 54 and single flange portion 56, so that the rolling portion of the top roller 70 is in position to contact said angled portion 80.

Associated with the mast assembly 20, and being a part thereof, are load lifting means comprising a fork carriage 82. Said fork carriage 82 is made up of a frame 83 and forwardly extending arms 85. Elongated member 44 has a pair of parallel edge flange portions 84,86 extending from the base portion 50 thereof, and generally perpendicular to the base portion 50 thereof. Said pair of flange portions 84,86 are disposed toward the elongated member 46, as shown. Elongated member 46 has a pair of parallel edge flange portions 88,90 extending from the base portion 54 thereof, and generally perpendicular to the base portion 54. Said pair of flange portions 88,90 are disposed toward the elongated member 44. Said flange portions 84,88 are actually forward flange portions, and flange portions 86,90 are rearward flange portions.

The elongated member 44 defines an angled portion 92 which interconnects the base portion 50 and the rearward flange portion 86, and the elongated member 46 similarly defines an angled portion 94 which interconnects the base portion 54 and the rearward flange portion 90.

Mounted to the frame 83 of fork carriage 82 are rollers 96,98,100,102. Rollers 96,98 are positioned between the flange portions 84,86, with the rolling portions of the rollers 96,98 positioned adjacent flange portions 84,86. The axis of roller 98 is substantially directly below the axis of roller 96. Rollers 100,102 are positioned between the flange portions 88,90 with the rolling portions of these rollers 100,102 adjacent the flange portions 88,90. The axis of the roller 102 is substantially directly below the axis of roller 100.

A roller 104 is mounted to the frame 83 and is positioned with its axis below the axis of roller 96 and above the axis of roller 98. A roller 106 is also mounted to the frame 83 and is positioned with its axis below the axis of roller 100 and above the axis of roller 102. The rollers 104,106 are positioned to contact the rearward flange portions 86,90 of the elongated members 44,46 respectively, to provide positive lateral location of the fork carriage 82 relatively to the elongated members 44,46.

The rollers 98,102 are shimmed so as to be positioned to contact the angled portions 92,94 respectively. This construction allows movement of the fork carriage 82 along the elongated members 44,46 upwardly and downwardly, meanwhile providing positive forward-rearward locations of the fork carriage 82 relative to the elongated members 44,46.

In the operation of the mast assembly 20, a cylinder, chains, and sheaves may, of course, be utilized to provide proper raising and lowering of the elements.

Side thrusts on the fork carriage 82 are taken by the rollers 104,106 which contact flange portions 86,90 respectively, and the rollers 98,102 which are properly shimmed to bear on angled portion 92,94. With an off center load, the side thrust roller on one side of fork carriage 82 and the lower roller on the other side of the fork carriage 82 handle the turning moment placed on the fork carriage 82. With side thrusts in either direction, because of the placing of the rollers 104,106 to contact the rearward flange portions 86,90 and the placing of rollers 98,102 to contact angled portions 92,94 which are themselves rearward, loads are applied to the elongated members 44,46 as closely as possible to the rear portions thereof, where the cross braces 48 are fixed, so that there is little tendency for the elongated members 44,46 to open up or spread apart upon such application of side thrust thereto. The particular placing of the rollers 104,106 relative to rollers 98,96 and rollers 102,100 respectively, promote stability and strength.

Figure 7:
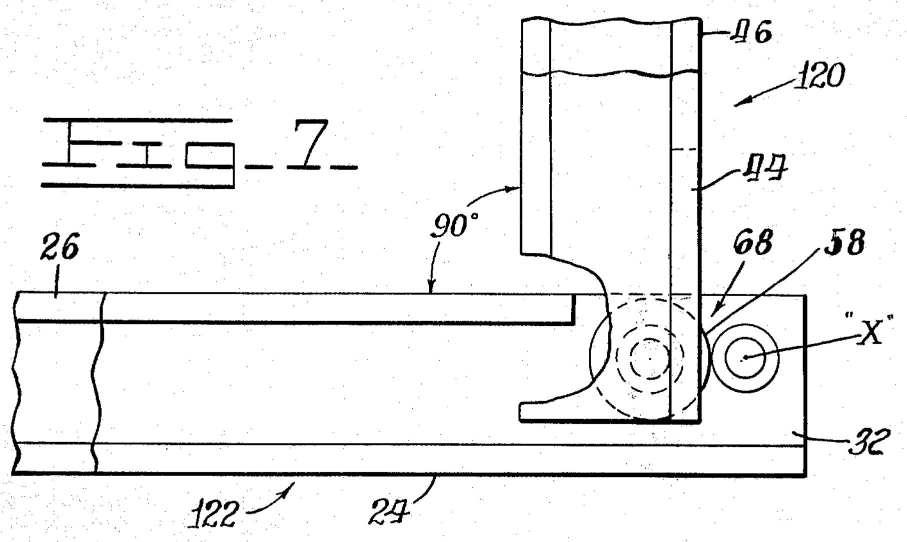
FIG. 7 is a diagrammatic view with portions broken away of the slider element being positioned in the channel element.

In the method of this invention, referring to FIGS. 2 and 7, portions of the longitudinally elongated slider members 44,46 are passed through the cutout end openings 72 of the channel members 24,26 with said portions and associated bottom rollers 58,62 positioned within their respective channel members 24,26.

The slider members 44,46 are already connected to form slider element 120 and the channel members 24,26 are already connected to form the channel element 122. The slider element is angularly disposed relative to the channel element 122, preferably at an angle of about 90°, during insertion of the slider element 120 into the channel element 122.

The slider element 120 in the inserted position in the channel element 122 has each of its bottom rollers 58,62 spaced from respective preselected locations X on the base 32,38 of the channel members 44,46.

Figure 8:
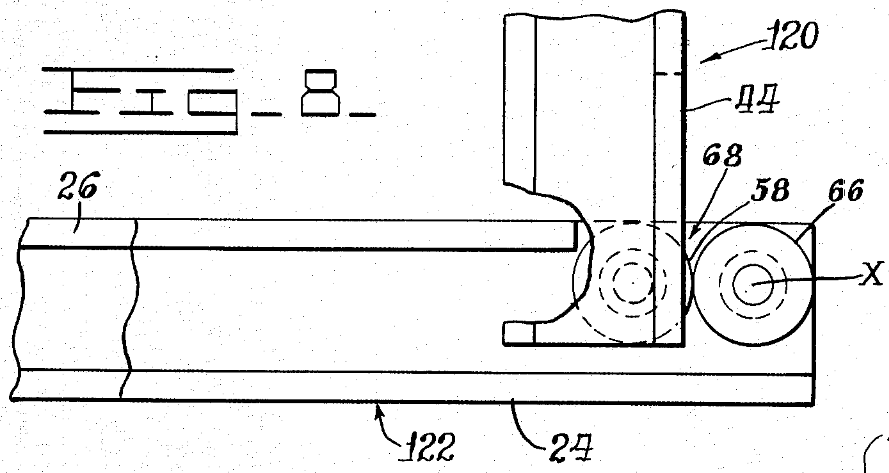
FIG. 8 is a diagrammatic view with portions broken away of the slider element positioned for installation of the top rollers.

Referring to FIGS. 2 and 8, after so positioning the slider element 120, a top roller 66,70 is installed on a respective channel member 44,46 at the respective preselected location X. It should be noted on FIG. 8 that the openings 72 and the dimensions of the rollers 58,62 and 66,70 are sized each relative to the others such that after the top rollers 66,70 are installed, the slider element 120 is locked in movable engagement with the channel element 122.

Figure 11:
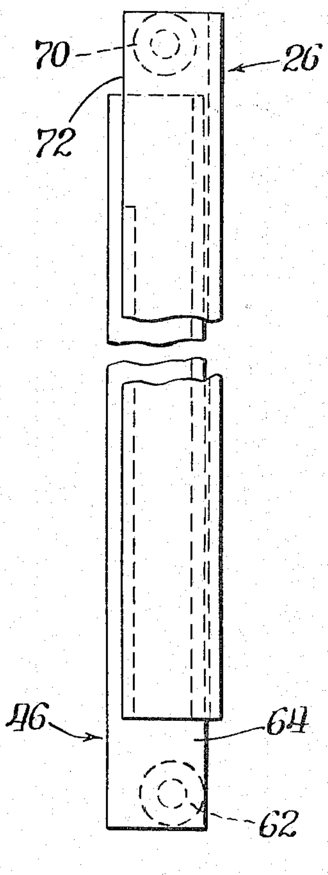
FIG. 11 is a diagrammatic view of the assembled mast.
Figure 5:
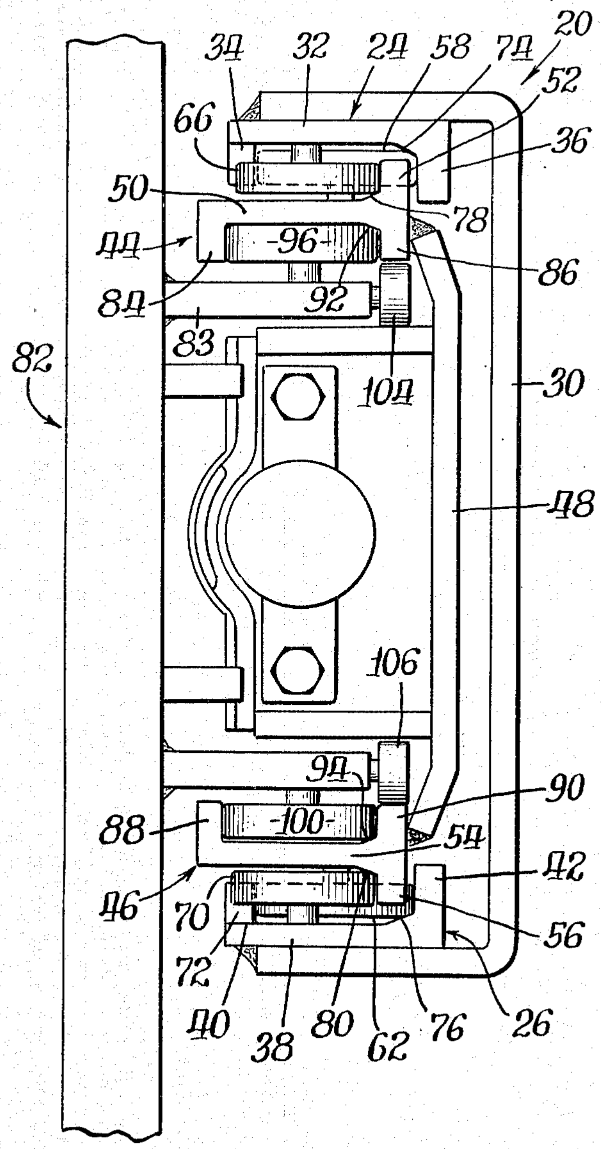
FIG. 5 is a plan view of the mast and carriage assembly.
Figure 6:
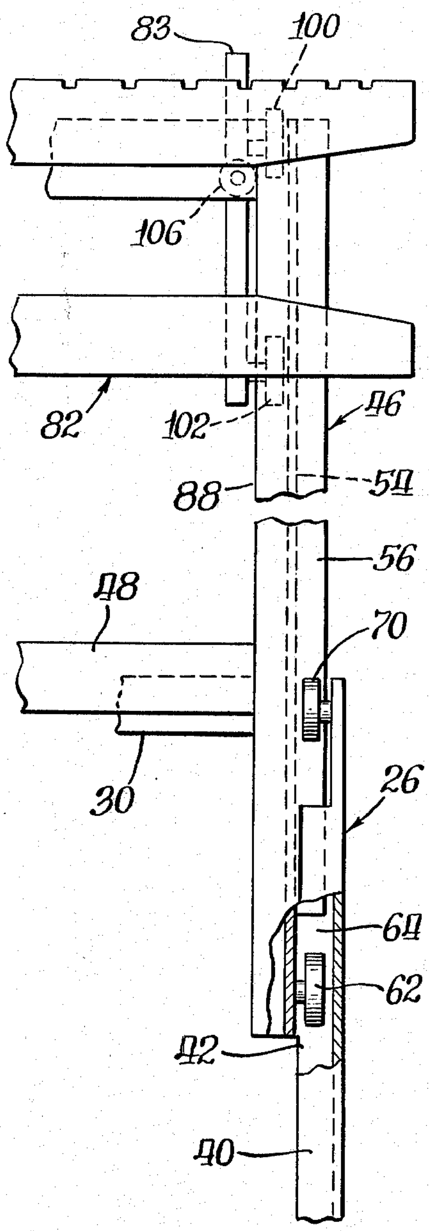
FIG. 6 is a front elevation, with portions broken away, of a portion of the mast and carriage assembly.
Figure 9:
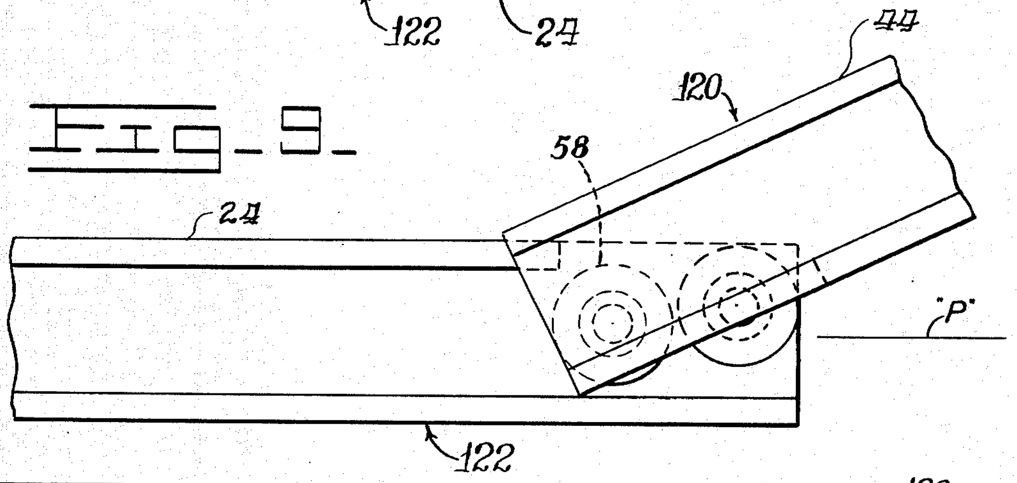
FIG. 9 is a diagrammatic view of the slider element being pivoted into alignment with the channel element.
Figure 10:
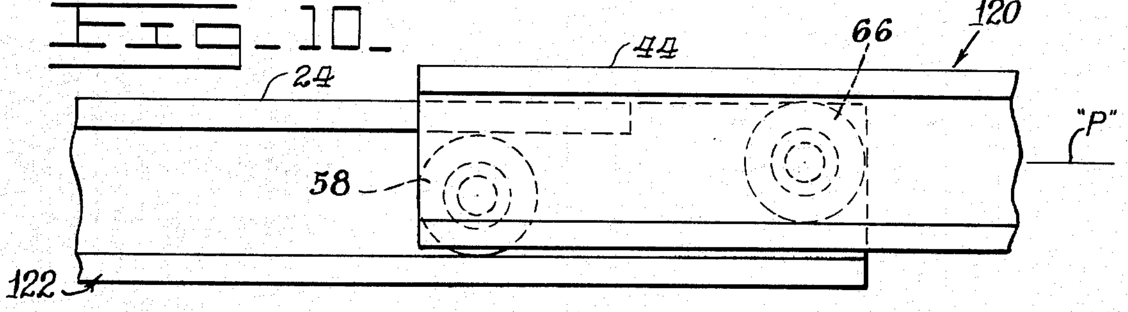
FIG. 10 is a diagrammatic view of the slider element aligned with the channel element and a portion of the slider element being positioned within the channel element.

Referring to FIGS. 2, 9, and 10, the slider element 120 is then pivoted into the plane P of the elongated axis of the channel element 122 and the slider element 120, the channel element 122 are urged together, and the slider element 120 is slid through the channel element 122 to the assembled position as shown in FIG. 11.

By so manipulating the slider element in the method of this invention, the time utilized to assemble the mast is reduced, which represents the voidance of waste.

Other aspects, objects and advantages will become apparent from a study of the drawings and the claims and it should be understood that this invention should not be limited thereto.

What is claimed is:

1. A method for assembling a lift truck mast having an elongated slider member positioned in an elongated channel member, said slider member having a bottom roller adjacent a bottom end thereof and a flange opening adjacent said bottom end and said channel member having an end opening through a flange at a location adjacent a preselected location on a base of the channel member, comprising:

positioning the end portion of the slider member through the end opening of the channel member with the bottom roller within the channel member, said slider member being angularly disposed relative to said channel member and the bottom roller spaced from the preselected location;

thereafter installing a top roller on the channel member at said preselected location;

pivoting the slider member into the plane of the elongated axis of the channel member with said top roller passing through said slider flange opening; and urging the slider member and the channel member together and sliding the slider member into the channel member.

2. A method, as set forth in claim 1, wherein the slider member is disposed relative to the channel member at an angle of about 90° during positioning.

3. A method, as set forth in claim 1, wherein there are a plurality of slider members and channel members each having a bottom roller and being connected to form a slider element having substantially parallel slider members and a channel element having substantially parallel channel members and including;

installing a plurality of top rollers on each channel member at the respective preselected locations.

* * * * *